United States Patent
Bijani et al.

(10) Patent No.: US 9,268,539 B2
(45) Date of Patent: *Feb. 23, 2016

(54) USER INTERFACE COMPONENT

(71) Applicant: ACCENTURE GLOBAL SERVICES LIMITED, Dublin (IE)

(72) Inventors: Pramod Bijani, Mumbai (IN);
Siddharth Mehrotra, Mumbai (IN);
Vikrant Shyamkant Kaulgud,
Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,585

(22) Filed: Mar. 25, 2014

(65) Prior Publication Data

US 2014/0282379 A1 Sep. 18, 2014

Related U.S. Application Data

(63) Continuation of application No. 13/424,895, filed on Mar. 20, 2012, now Pat. No. 8,694,960.

(51) Int. Cl.
*G06F 9/45* (2006.01)
*G06F 9/44* (2006.01)

(52) U.S. Cl.
CPC .. *G06F 8/38* (2013.01); *G06F 8/41* (2013.01); *G06F 9/4448* (2013.01)

(58) Field of Classification Search
None
See application file for complete search history.

(56) References Cited

U.S. PATENT DOCUMENTS

| | | | |
|---|---|---|---|
| 6,246,403 B1 | 6/2001 | Tomm | |
| 6,717,593 B1 | 4/2004 | Jennings | |
| 8,015,175 B2 | 9/2011 | Fairweather | |
| 8,694,960 B2 * | 4/2014 | Bijani et al. | 717/112 |
| 2004/0183832 A1 | 9/2004 | Baccou | |
| 2006/0123345 A1 | 6/2006 | Parimi | |
| 2009/0328010 A1 | 12/2009 | Cao et al. | |

FOREIGN PATENT DOCUMENTS

| | | |
|---|---|---|
| EP | 1770510 A2 | 4/2007 |
| GB | 2357348 A | 6/2001 |
| WO | WO-2005073847 A2 | 8/2005 |

OTHER PUBLICATIONS

Fowler, Martin, "Inversion of Control Containers and the Dependency Injection pattern", Jan. 23, 2004, pp. 1-19.
Ali, Mir Farooq, et al., "Building Multi-Platform User Interfaces with UIML", Internet Citation, Nov. 9, 2001, pp. 1-12.

* cited by examiner

*Primary Examiner* — Chuck Kendall
(74) *Attorney, Agent, or Firm* — Mannava & Kang, P.C.

(57) ABSTRACT

A user interface component is displayed according to an implementation language independent description. An implementation language dependent specification for the user component is created from the implementation language independent description. The user interface component is created and displayed according to the implementation language dependent specification.

21 Claims, 9 Drawing Sheets

FIG 5

USER INTERFACE COMPONENT

PRIORITY

The present application is a continuation of U.S. patent application Ser. No. 13/424,895, filed on Mar. 20, 2012 which claims priority under 35 U.S.C. 119(a)-(d) to EP Application 11 004 453.4-2211, filed on May 31, 2011, which are incorporated by reference in their entireties.

TECHNICAL FIELD

The application relates to a computer-implemented method, system and computer program product for displaying a graphical user interface component according to an implementation language independent description of the user interface component. The application also relates to generating a graphical user interface including a plurality of user interface components.

BACKGROUND

Development of graphical user interfaces, particularly for rich Internet applications, may require coordination between a number of users and developers. Application developers may need to create a number of prototypes, each prototype requiring user feedback, before a graphical user interface meeting all user requirements is developed. The process of creating and modifying a graphical user interface in order to create a production version of the graphical user interface can be expensive and time intensive. Moreover, even when the production version of the graphical user interface is created, new widgets and features may need to be added. The addition of such widgets and features may also require multiple interactions between users and developers, as well as the creation of multiple prototype user interfaces (i.e. prototypes), before an acceptable graphical user interface meeting all requirements is created.

Conventional approaches to graphical user interface development may involve a developer receiving a written requirements specification from the user. Alternatively, developers and users may meet physically or virtually in order to create a list of requirements together. Once the requirements have been established, a prototype or demonstration version of the graphical user interface may be developed in order to obtain user feedback. Multiple such versions may need to be developed, possibly due to communication difficulties between users and developers. In addition, problems may arise (e.g. the code of an existing user interface may need to be modified) due to rapid progression of technology and/or the addition of new features to a user interface language, or even the creation of an entirely new language that can be used to display a graphical user interface.

Another problem that may arise in the development of a graphical user interface is the lack of standardization of user interface components across one or more graphical user interfaces. The lack of standardization may arise due to a failure to follow user interface (UI) presentation guidelines (i.e. instructions specifying how UI components should look when they are displayed) uniformly, incorrect translation of user requirements into implementation language code, or poor communication between user interface developers. Also, user interface requirements may evolve as users view prototypes of the graphical user interface and become more familiar with the possibilities available for displaying various user interface components. Developing the new user interface prototypes may be particularly time consuming if user requirements are manually translated into user interface components written in implementation language code. Manual translation of user requirements into implementation language code may also lead to a lack of standardization and a loss of usability due to the use of presentation attributes selected based on user requirements rather than standard presentation attributes. Prevention and detection of errors resulting from manual translation of user requirements into implementation language code may be effort and cost intensive.

Accordingly, there may be a need for a tool to automate or improve automation of the translation of requirements describing a graphical user interface into a graphical user interface that can be displayed. Moreover, it may be a problem to enable users to easily and intuitively describe user interface components without needing to be concerned about implementation language dependent properties or attributes of the user interface components. It may also be a problem to quickly generate a prototype of a user interface based on user requirements or an implementation language independent description of the user interface, thereby reducing errors in the translation of requirements into code and enabling new features and refinements to be gathered quickly and accurately. Improved automation of the translation of user requirements into implementation language dependent code may reduce the effort required to generate a user interface or components of the user interface. Moreover, standardization of the user interface may be improved through the identification and application of the appropriate presentation rules. In particular, it may be possible to more effectively match user requirements to implementation dependent features. Accordingly, user requirements can be quickly prototyped and demonstrated and the correspondence between user requirements and implementation dependent features is automatically documented, e.g. by means of a map or dictionary.

The creation of a user interface and components thereof according to an implementation language independent description of the user interface may enable users to describe the graphical user interface in a simplified way. This may increase the involvement of users in the development of the graphical user interface, thereby reducing the time required for development, particularly by decreasing the number of prototypes required. In some cases, a user would be able to create the graphical user interface on his own without needing to understand the underlying implementation and without requiring the assistance of a developer.

The subject matter described in the present specification can be implemented as a method or as a system, possibly in the form of one or more computer program products. The subject matter described in the specification can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the specification.

In addition, subject matter described in the present specification can also be implemented as a system including a processor and a memory coupled to the processor. The memory may encode one or more programs and cause the processor to perform one or more of the methods described in the specification. Further subject matter described in the specification can be implemented using various machines.

Details of one or more implementations are set forth in the exemplary drawings and description below. Others features will become apparent from the description, the drawings, and from the claims.

SUMMARY

According to some embodiments of the claimed subject matter, technical terms used in the present specification may be understood according to the following technical definitions.

A graphical user interface (also referred to as a user interface, GUI or UI) may include one or more user interface components.

A user interface component may be understood as an element of a user interface that is can be displayed as part of the user interface. In particular, a user may be able to interact with the user interface component and the user interface component may define the appearance of the user interface. Examples of user interface components are as follows: a button, a window, a pointer, a menu bar, a list box, a combo box, a datagrid, or a video.

An implementation language independent description of the graphical user interface includes implementation language independent descriptions of one or more user interface components.

An implementation language independent description of a user interface component includes an implementation language independent type. The implementation language independent description may include one or more presentation rules and/or one or more presentation attributes. Alternatively, the one or more presentation rules and/or presentation attributes may be identified using a type definition, where the type definition specifies presentation rules and/or presentation attributes corresponding to the implementation language independent type.

The implementation language independent type can be associated with one or more implementation language dependent types, where each implementation language dependent type has an associated implementation language. The implementation language independent type describes (or labels) the corresponding user interface component. Examples of implementation language independent types are as follows: a button, a window, a pointer, a menu bar, a list box, a combo box, a datagrid, or a video.

The implementation language dependent type may be understood a classification of the user interface component that may identify potential attributes of the user interface component (e.g. characteristics of a shape such as the circumference of a circle). The implementation language dependent type may also determine presentation rules and presentation attributes that can be applied to a user interface component. The implementation language dependent type may be similar to the implementation language independent type, however, a difference between the two may be that the implementation language dependent type includes characteristics of a particular implementation language. For example, implementation language dependent types in the Flex programming language may include the "mx" prefix.

The implementation language independent description may require translation or other processing according to a set of instructions in order to produce an implementation language dependent specification that can be displayed. The implementation language independent description may be more declarative, i.e. more focused on what user interface component to display rather than how to display the component, than the implementation language dependent specification. In other words, the implementation language dependent specification may be more imperative, i.e. more focused on how to display the user interface component, than the implementation language independent description.

Parsing, e.g. by a description parser, may involve checking the syntax of an input and building a data structure from the input. Parsing may further include the identification of tokens or elements of the input.

A binary file is a computer file which contains data encoded in binary form. The binary file may contain bytes that are intended to be interpreted as something other than text characters or ASCII characters.

A rich Internet application is a web application that has characteristics of a desktop application. A rich Internet application may be executed by a browser via a browser plug-in, an independent sandbox, or a virtual machine. A software framework may need to be installed before executing the rich Internet application. The software framework may download, update, verify, and execute the rich Internet application. Displaying the user interface component or the user interface by means of the implementation language dependent specification may involve executing the implementation language dependent specification within a rich Internet application framework, e.g. Adobe Flex (Adobe is a trademark of Adobe Corporation). The implementation language dependent specification may be compiled into a binary file before it is executed and displayed.

Examples of implementation languages are MXML (an extension of XML maintained by Adobe), extensible application mark-up language (XAML), scalable vector graphics (SVG), user interface mark up language (UIML), XML user interface language (XUL), Coral, Java FX (Java is a trademark of Oracle Corporation). Combinations of one or more of these languages may also be used. The implementation language may include presentation functionality, e.g. functionality required to place user interface component in a chosen location on a page.

A presentation rule may determine one or more presentation attributes of a user interface component. Thus, the presentation rule may determine the look and formatting of the user interface component. The presentation rule may correspond to one or more user interface components. In one example, the presentation rule may be implemented as a style rule and may be part of a cascading style sheet.

A presentation attribute of a user interface component may affect the look and/or formatting of the user interface component. Examples of presentational attributes are positions, fonts, colors, background styles, element alignments, borders, and sizes.

A pre-written wrapper may be used to dynamically create and display user interface components. The wrapper may be written in the same implementation language as the implementation language dependent specification of the user interface components. The wrapper may be used to generate the entire user interface including all the user interface components specified in the implementation language independent description of the user interface.

BRIEF DESCRIPTION OF THE DRAWINGS

FIG. 5 shows a screen shot of an integrated development environment including a software component that can be used to verify presentation semantics of the implementation language dependent specification of the user interface.

DETAILED DESCRIPTION

In the following text, a detailed description of examples will be given with reference to the drawings. It should be understood that various modifications to the examples may be made. In particular, elements of one example may be combined and used in other examples to form new examples. The following specification includes some exemplary XML code. Whitespace may have been added to the XML code in order to improve readability.

Figure 1:
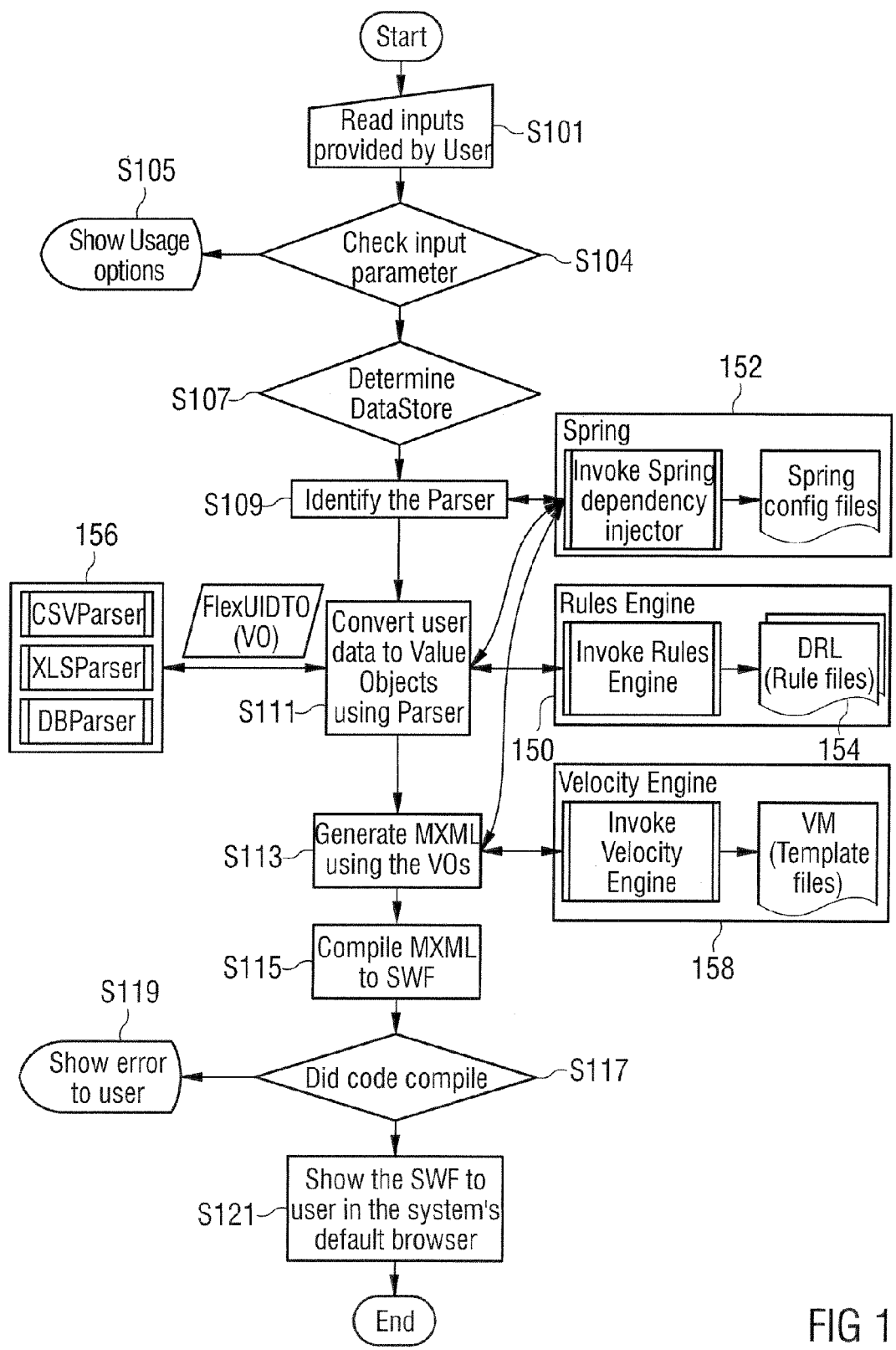
FIG. 1 is a flow chart of an exemplary method for displaying a user interface according to an implementation language independent description of the user interface.

FIG. 1 depicts a flow chart of a method for displaying a user interface according to an implementation language independent description of the user interface. The flow chart may also correspond to a system and a computer program product. The computer program product may be referred to as a tool.

At step S101, user input may be received specifying a location of an implementation language independent description of a user interface. The user interface may comprise one or more user interface components. The implementation language independent description is used to create an implementation language dependent specification of the user interface. The location of a compiler for the implementation language dependent specification may also be specified at step S101. In a specific example, the Flex software development kit (SDK) may be used to compile the implementation language dependent specification into a binary file. The location of a set of presentation rules (referred to in FIG. 7) may also be specified at step S101. The set of presentation rules may be in the form of a cascading style sheets (CSS) style sheet.

At step S103 the inputs provided in step S101 may be verified. If there is an error in the user input, e.g. the user fails to specify a location of the implementation language independent description or fails to specify a location from which the implementation language independent description can be retrieved. The location of the implementation language independent description of the user interface component may be determined at step S107. Furthermore, the location may be referred to as a data store. The determination of the location may be carried out by a rules engine 150. Also, the rules engine 150 may be a production rule system for processing decision logic. An example of a system that can be used to implement the rules engine 150 is Drools (a business rule management system maintained by RedHat).

The rules engine 150 may be used to identify a source, e.g. a database, based on user input. Once the source of user input has been identified, the rules engine 150 may send an identifier to be processed by means of dependency injection (explained further below) in order to execute appropriate parser.

The parser may then create one or more value objects corresponding to user interface components. In some cases, each value object may be implemented as a single row of data.

At step S109 of a description parser for the implementation language independent description may be selected from parsers 156. The description parser may be selected based on a characteristic of the implementation language independent description. Examples of the characteristic are the file format or the means of receiving the implementation language independent description. Possible file formats of the implementation language independent description include Microsoft Excel (Microsoft and Excel are trademarks of Microsoft Corporation) formats such as the binary interchange file format (BIFF), Office Open XML and XML spreadsheet. The file format could also be comma separated value (CSV) or some other format where elements of a text file or separated by the delimiters. The means of receiving the implementation language independent description may be a database management system, e.g. a relational database management system. Exemplary description parsers are a CSV parser, an XLS parser and a DB parser.

The rules engine 150 referred to in steps S107 and S109 may be invoked via dependency injection. For example, the rules engine 150 may be invoked by means of an inversion of control container 152. The inversion of control container 152 may be implemented by means of the Spring Framework (maintained by SpringSource).

The inversion of control container may be configured for the rules engine 150 as follows:

TABLE 1

```
<bean name="com.acn.rule.DataStoreParser"
    class="com.acn.rule.RulesWrapper"
        singleton="true">
    <constructor-arg type="java.lang.String"
        value="com/acn/properties/DataStoreParser.drl"/>
</bean>
```

An invocation of the rules engine 150 may include the following code:

TABLE 2

```
KnowledgeBuilder kbuilder = KnowledgeBuilderFactory.-
newKnowledgeBuilder( ); kbuilder.add(ResourceFactory.-
newClassPathResource(ruleFile),ResourceType.DRL);
```

In the example of Table 2, "KnowledgeBuilder" is a Drools API and "ruleFile" corresponds to a value in the Spring configuration file.

In some cases, dependency injection, possibly achieved by means of an inversion of control container, may be used for an object constructor and for passing the required parameters needed to instantiate objects. The rules engine 150 and rules configuration files 154 may be declared as dependencies. Instantiation and configuration of the rules engine 150 may be handled by the inversion of control container 152. The inversion of control container 152 may also be referred to as an external container. Use of the inversion of control container 152 may make it easier to manage changes to the location of the rules engine 150 and rules configuration files 154. Use of the rules engine 150 and the inversion of control container 152 may make the tool easier to update and modify, and more portable. In other words, the inversion of control container 152 may enable a decoupling of the execution of a software module (e.g. the rules engine 150) from its implementation. Accordingly, implementation of the display of user interface components and user interfaces can separated from the use of software modules invoked via the inversion of control container 152 (e.g the rules engine 150), and software modules such as the rules engine 150 can be easily replaced without having a side effect on other parts of the tool.

At step S111, the description parser selected from the parsers 156 at step S109 may read the implementation language independent description from the location identified at step S107. In other words, the implementation language independent description is received by the description parser. Step S111 may include creating a parsed description (also referred to as an internal representation) of the implementation language independent description in a memory. In some implementations, the parsed description may take the form of one or more value objects. Each value object may be implemented as an array of objects that automatically expands so that new objects may be easily included. For example, in a Java implementation, the value object may be implemented as a Java.util.arrayList with some further enhancements. In particular, unlike a standard Java.util.arrayList, the value object may group information (e.g. features) for each UI component together, so that each UI component and its corresponding features can be distinguished from other UI components in the value object. If the parsed description is implemented in a von Neumann language such as C or Ada (as opposed to an object-oriented language), the parsed description could be implemented using other data structures (rather than objects), such as linked lists.

According to a specific example, each value object includes information about a specific user interface component, e.g. the language dependent type of the component, presentation rules, and presentation attributes. The value objects may be transferred to the parsers 156 by means of at least one data transfer object, also referred to as FlexUIDTO. The data transfer object can be used to carry or transfer information between different software modules, e.g. to transfer value objects to the parsers 156. The data transfer object may be understood as a composite object, i.e. a collection of value objects. The data transfer object may include all the data needed to generate the user interface component based on the implementation language. The data transfer object may be implemented as a Java object.

Once the parsed description has been created, a set of instructions may be selected for processing the parsed description. The set of instructions for processing the parsed description may be implemented as a template for use with a template processor 158. Alternatively, the set of instructions may be implemented as part of a larger computer program not associated with the template processor 158.

At step S113, the parsed description may be processed according to the set of instructions. The processing may result in the creation of an implementation language dependent specification of the user interface component. Processing may be carried out by the template processor 158, also referred to as a template engine or a template parser. The template processor 158 may be understood as software that combines one or more templates with content in order to produce a result document. The template processor 158 may also be understood as a programming language whose primary purpose is to process data and corresponding templates in order to output text, e.g. program code. According to a specific example, the template processor 158 may be implemented using Velocity (maintained by Apache).

Step S113 may involve including an association of the implementation language dependent type of the user interface component with a presentation rule determining the look and/or format of a user interface component in the implementation language dependent specification. In a specific example, the association may be a structural marker that includes both the implementation language dependent type and the presentation rule.

Use of the set of instructions (possibly implemented as a template and processed using the template processor 158) may be advantageous since multiple implementation language dependent specifications in different implementation languages can easily be generated from a single implementation language independent description by means of different sets of instructions. In some cases, the template processor 158 may be invoked using the inversion of control container 152. For example, the inversion of control container may be configured for the template processor 158 as follows:

TABLE 3

```
<bean id="VelocityEngine" class=
    "org.springframework.ui.velocity.VelocityEngineFactoryBean">
    <property name="velocityProperties">
        <props>
            <prop key="resource.loader">class</prop>
            <prop key="class.resource.loader.class">
                org.apache.velocity.runtime.resource.loader.-
                ClasspathResourceLoader
            </prop>
        </props>
    </property>
</bean>
```

A number of implementation languages could be used such a MXML, XAML, SVG, UIML, XUL, Curl, or Java FX. Similar to the rules engine 150, use of the inversion of control container 152 in order to select the set of instructions (possibly implemented using the template processor 158 and the template) may be advantageous in that the set of instructions may be more easily modified and ported to different operating environments.

At step S115, the implementation language dependent specification may be compiled into a binary file. For example, if the implementation language is MXML, the format of the binary file may be SWF (also referred to as small web format or shockwave format). Compiling the implementation language dependent specification may involve the performance of compilation of operations, e.g. lexical and syntactical analysis and binary code generation, on the implementation language dependent specification. The binary file may be displayed by means of a web browser, possibly via a software framework of a browser plug-in. In a specific example, the binary file is an SWF file that can be displayed using Adobe Flash. According to the example, the binary file can be created using an Adobe Flash builder integrated development environment (IDE), a Flex software development kit (SDK) or a Flex server.

At step S117, a determination is made as to whether the implementation language dependent specification was successfully compiled. If the compilation was unsuccessful, one or more error messages may be displayed to the user at step S119. Even if the compilation was successful, one or more warning messages may be displayed.

At step S121, a validation process may be carried out in order to determine whether the user interface and the components thereof, as specified by the implementation language independent description, were generated according to the intent of the user. According to a specific example, the compiled SWF file may be displayed in a web browser window.

Figure 2:
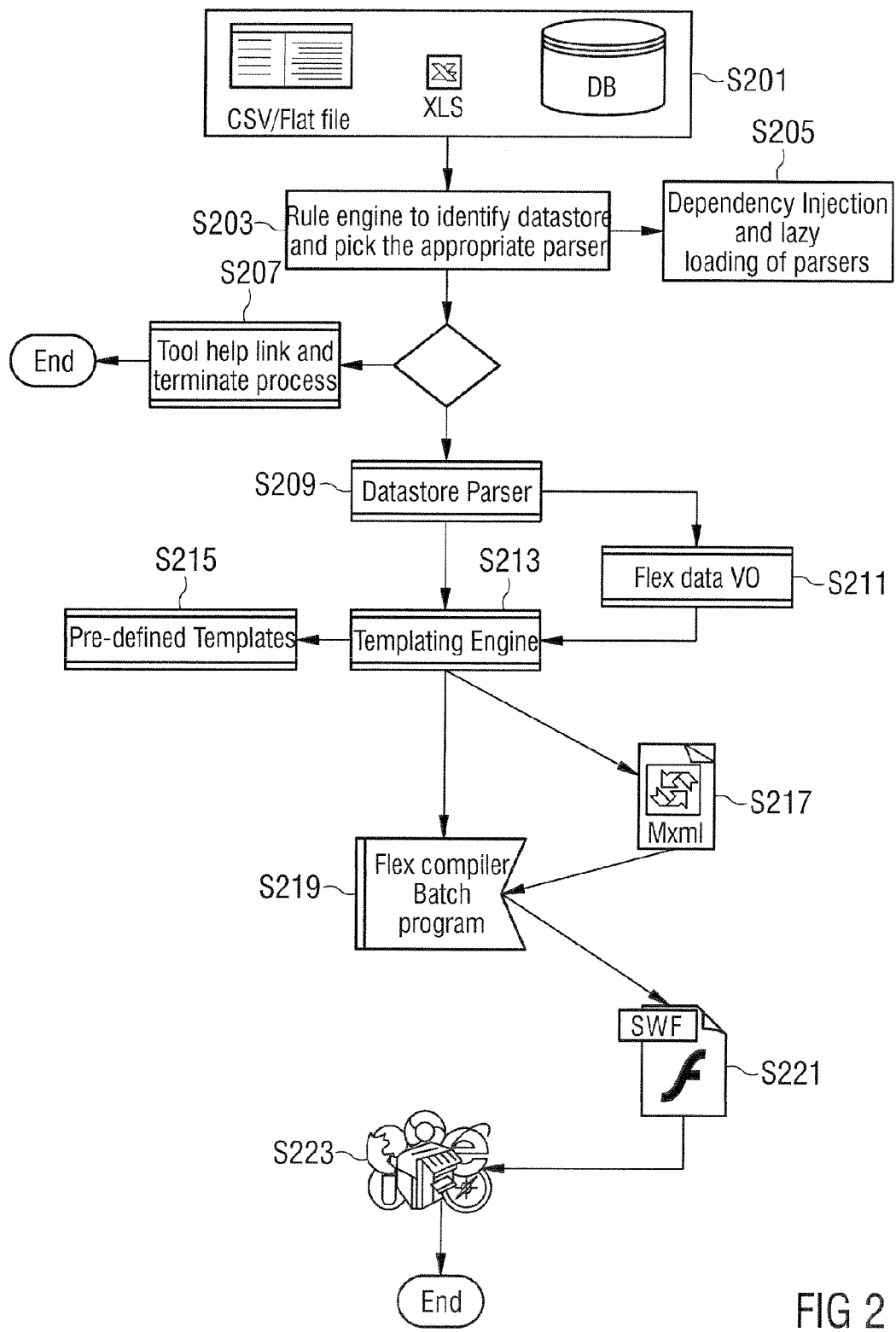
FIG. 2 is another flow chart showing steps and modules used to display a user interface according to an implementation language independent description of the user interface.

FIG. 2 also shows a method for displaying a user interface according to an implementation language independent description of the user interface. The steps depicted in the flow chart of FIG. 2 may be divided into four sections: data store processing comprising step S201, rules processing comprising steps S203 to S207, core processing comprising steps S209 to S217, and validation and presentation comprising steps S219 to S223. Step S201 visually depicts the implementation language independent description of the user interface. The implementation language independent description may be received by accessing a CSV file, a Microsoft XLS file, or a conventional database, e.g. a relational database. Table 4 shows an example of an implementation language independent description implemented in CSV format:

TABLE 4

Horizontalbox,
width,100%
height,100%
ComboBox,
style,assetComboBoxDropDown
prompt,Im a Combo Box!
x,100
y,100
space,
width,100
height,50
Button,
style,assetButton
label,Im a Button!
x,200
y,200

The example of Table 4 includes three implementation language independent types: "Horizontalbox", "ComboBox", and "Button". Also, the example of Table 4 includes two presentation rules: "assetComboBoxDropDown" and "assetButton". In addition, the example of Table 4 includes four presentation attributes "width", "height", "x", and "y".

At step S203, the rules engine 150 may be invoked, e.g. via the inversion of control container 152, in order to identify the data store and select the description parser from the parsers 156 based on a characteristic of the implementation language independent description. The rules engine 150 may be implemented as a system that executes one or more rules in a run time environment and which can be used for making decisions. The rules engine 150 may select the description parser from the parsers 156 based on user input. The rules engine 150 may operate according to a rules file 154. Table 5 shows a sample rules file that can be used to control the operation of the rules engine 150:

TABLE 5

```
rule "file"
    when m : ParserDRLMessage( ruleToExecute == "file" )
    then
        DataStore ds = m.getDataStore( );
        String fileName = ds.getSource( );
        String extention = fileName.substring(fileName.-
            lastIndexOf(".")+1,
            fileName.length( ));
        m.setRuleToExecute(extention.toLowerCase( ));
        update(m);
    end
rule "csv"
    when m : ParserDRLMessage( ruleToExecute == "csv" )
    then
        m.setParserName("CSVParser");
    end
```

Thus, according to the example of Table 5, both the "file" rule and the "cvs" rule are used to parse a csv file. In particular, a filename with a csv extension may be provided by the user, the extension of the file may be extracted using the "file" rule and the "csv" rule is then activated in order to select a CSVParser. Alternatively, if a filename with a different extension is provided (e.g. "xls"), the extension may be extracted using the "file" rule and then an "xls" rule (not shown) may be used to select an XLSParser.

At step S205, the description parser, possibly implemented using the CSV parser, may be loaded using the inversion of control container 152, depending on the selection made in step S203. At step S207, the process controlling the rules engine 150, as well as the selection of the description parser and the identification of the data store, may be terminated since the input provided by the user is not complete. In other words, step S207 may be carried out to provide the user with usage information regarding the tool, since step S207 is reached when the user input is invalid or incomplete.

At step S209, an implementation language for displaying the user interface component may be determined. The implementation language may be determined in a number of ways, e.g. based on user input or based on the technology most suitable for displaying the user interface. The description parser, also referred to as a data store parser, may be used to identify an implementation language independent type. The implementation language independent type may be identified by checking a map entry. Two exemplary map entries are shown below:

TABLE 6

Button,mx:controls.Button
ComboBox,mx:controls.ComboBox

In particular, parsing the implementation language independent description may comprise identifying an implementation language independent type, and optionally, identifying a presentation rule. Moreover, the implementation language independent description of the user interface may include one or more user interface components. Thus, parsing the implementation language independent description may involve identifying an implementation language independent type for each user interface component.

However, the description parser may be selected from the parsers 156 in order to parse the implementation language independent description of all user interface components in the user interface. In addition, a single implementation language may be selected for displaying all user interface components in the user interface.

At step S211, as mentioned above with respect to FIG. 1, the parsed implementation language independent description may be represented as one or more value objects. Other internal representations, which may or may not be object-oriented, could also be used. Table 7 shows an example of an implementation language independent description that has been modified in order to create the parsed description:

TABLE 7 mx.controls.ComboBox
prompt,Im a Combo Box!
color isStyle="true" ,0xff0000
height,101
width,100
mx.controls.Button
label,Im a Button!
color isStyle="true" ,0xff00ff
height,103
width,102

The modified description of Table 7 includes two implementation language dependent types, i.e. mx.controls.Combobox and mx.controls.Button. The two implementation language dependent types are dependent on the implementation language MXML. Modifying the implementation language independent description in order to create an implementation language dependent description, as shown in Table 7, may have the advantage of facilitating the creation of further implementation language dependent specifications (i.e. dependent on different languages) based on the same implementation language independent description. In particular, parsing the implementation language independent description may comprise determining one or more implementation language dependent types and then using those dependent types to create value objects.

At step S213, a set of instructions is selected for processing the parsed description. The set of instructions may be implemented as a template. In some implementations, the template processor 158 may be used for processing the set of instructions. In the specific example when the template processor 158 is Velocity, the template may be implemented as follows:

TABLE 8

```
#macro( createXML )
  #set ($compMap = $data.getComponentNames( ))
  #set ($comp = $compMap.keySet( ))
  #foreach($key in $compMap.keySet( ))
    #if ($key != "layout")
      #if ($key.indexOf(" ") > 0)
        <component type="$key.substring(0,$key.indexOf(" "))"
style="$key.substring($key.indexOf(" "), $key.length( )).trim( )">
      #else
        <component type="$key">
      #end
      #foreach($propertyKey in $compMap.get($key).keySet( ))
        #if ($propertyKey.indexOf(" ") > 0)
          <$propertyKey>$compMap.get($key).get($propertyKey)
</$propertyKey.substring(0,$propertyKey.indexOf(" "))>
        #else
          <$propertyKey>$compMap.get($key).get($propertyKey)
</$propertyKey>
        #end
      #end
      </component>
    #end
  #end
#end
<?xml version="1.0" encoding="UTF-8"?>
<components type="array">
#createXML( )
</components>
```

The exemplary template above can be used to generate user interface components supported by Adobe Flex, particularly with versions of the Flex SDK up to 3.5. The template is constructed so that it can be easily modified to generate new user interface components that are introduced in new versions of the Flex SDK. A plurality of templates may be separately created so as to have the flexibility of enhancing or modifying one of the templates without affecting any of the others. Moreover, it may be possible (and desirable) to process the parsed description using multiple templates, possibly arranged in a hierarchy. Due to the specific combination of components used in the tool, patches or fixes can be release as incremental updates without having to do a full regression test.

At step S215, the template may be selected from a plurality of predefined templates.

At step S217, processing of the parsed description according to the set of instructions may result in the creation of an implementation language dependent specification of the user interface. The following is an example of the implementation language dependent specification:

TABLE 9

```
<?xml version="1.0" encoding="UTF-8" ?>
- <components type="array">
  - <component type="mx.containers.HBox">
      <height>100%</height>
      <width>100%</width>
    </component>
  - <component type="mx.controls.Button" style="assetButton">
      <x>200</x>
      <label>Im a Button!</label>
      <y>200</y>
    </component>
  - <component type="mx.controls.ComboBox"
style="assetComboBoxDropDown">
      <x>100</x>
      <prompt>Im a Combo Box!</prompt>
      <y>100</y>
    </component>
  - <component type="mx.controls.Spacer">
      <height>50</height>
      <width>100</width>
    </component>
  </components>
```

The implementation language dependent specification above includes the following implementation language dependent types: mx.containers.HBox, mx.controls.Button, mx.controls.ComboBox, and mx.controls.Spacer. The exemplary implementation language dependent specification includes the following presentation rules: assetButton and assetComboBoxDropDown.

The presentation rules may be specified as styles, e.g. as follows:

TABLE 10

```
.assetComboBoxDropDown{
        fontFamily:      Arial, Regular;
        fontSize:        10;
        fontWeight:      normal;
        color:           #000000;
        paddingLeft:     2;
}
.assetButton {
        fontFamily:      Arial;
        fontSize:        11;
        fontWeight:      normal;
        height:          19px;
        color:           #000;
        themeColor:      #3274a9;
        disabledColor:   #7f7f7f;
        textRollOverColor: #000000;
        textSelectedColor: #000000;
        borderColor:     #B6ADA9;
        paddingLeft:     3px;
        paddingRight:    3px;
        padding-bottom:  3px;
        padding-top:     3px;
        cornerRadius:    3;
        highlightAlphas: 1, 0;
        fillAlphas:      1, .5, 1, 0;
        fillColors:      #c5d4db, #c5d4db, #c5d4db,
                         #c5d4db;
}
```

The styles of Table 10 can be used as presentation rules to process the parsed description. Alternatively, a user specified presentation rule, which corresponds to the implementation language dependent type determined by the tool, can be provided by the user with the implementation language independent description. Provision of the user specified presentation rule with the implementation language independent description may provide increased flexibility. However, the use (or allowance) of user specified presentation rules may hinder standardization.

A compiler may be identified in step S219. For example, the compiler may be Flex SDK or maven2 with sonatype APIs. Alternatively, the implementation language dependent specification may be directly displayed. It is possible that use of a compiler results in a display that is easier to use and has an improved appearance in comparison to the direct display of the implementation language dependent specification.

In step S221, the compiler may be used to generate a binary file. According to a specific example, the binary file may be in SWF format. In step S223, the compiled binary file may be displayed. The display of the binary file may be achieved using a web browser and an appropriate plug-in, e.g. Adobe Flash. Display of the binary file may give the user an opportunity to see how the user interface will look after it has been generated. The user may then validate that the user interface has been generated according to the user's requirements.

Figure 3:
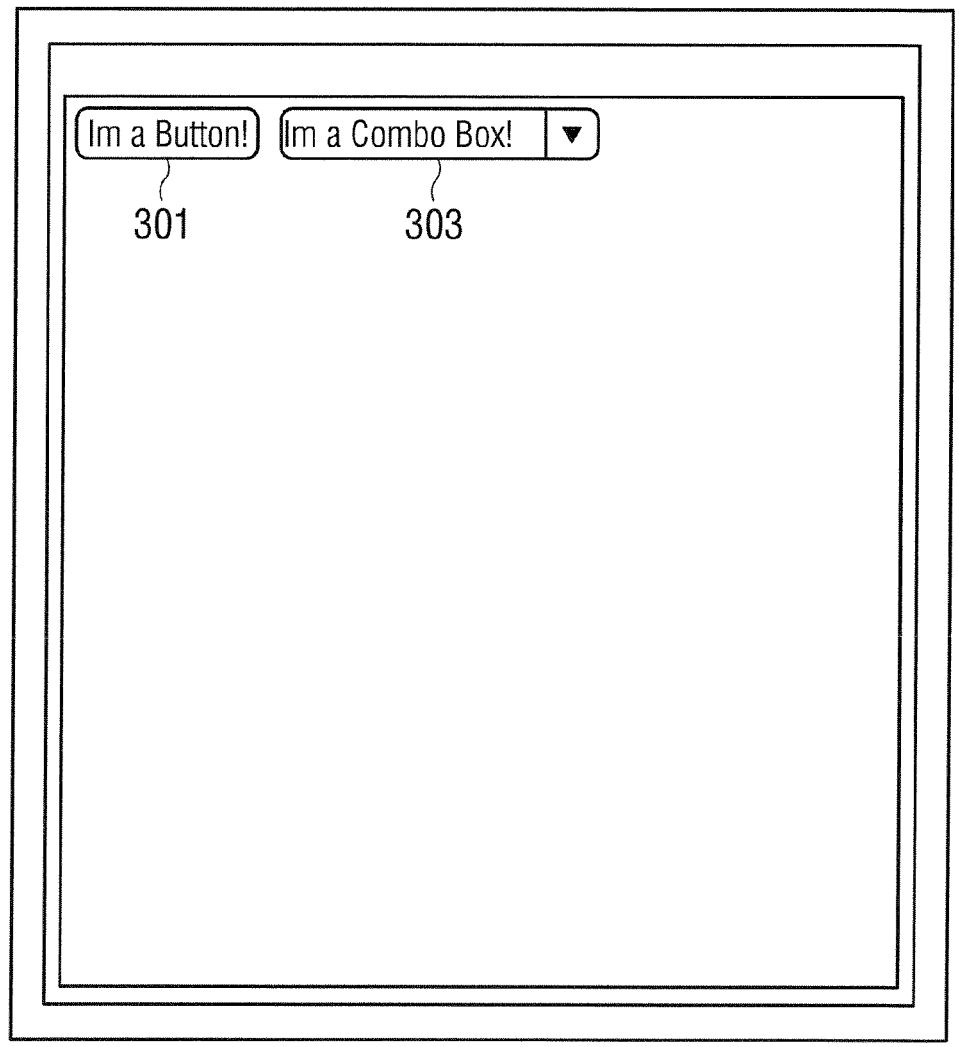
FIG. 3 shows a display of a user interface including a button and a Combobox displayed according to the implementation language independent description of the user interface.

FIG. 3 depicts a user interface including two user interface components 301 and 303. In particular, FIG. 3 includes a button 301 and a combobox 303. The user interface of FIG. 3 may be displayed by incorporating the implementation language dependent specification of the user interface into a wrapper. The wrapper may be written in the same implementation language as the implementation language dependent specification of the user interface. According to a specific example, if the implementation language dependent specification is in MXML, then the wrapper may be coded as follows:

TABLE 11

```
<?xml version="1.0" encoding="utf-8" ?>
- <mx:Application
    xmlns.mx="http://www.adobe.com/2006/mxml"
    creationComplete="creationCompleteHandler( )">
    <mx:Style source="D:\tmp\patent\test.css" />
- <mx:Script>
- <![CDATA[
        import mx.containers.Box;
        import flash.display.DisplayObject;
        import mx.core.UIComponent;
        import mx.controls.ComboBox; ComboBox;
        import mx.controls.Spacer; Spacer;
        import mx.containers.HBox; HBox;
        import mx.containers.VBox; VBox;
        protected function creationCompleteHandler( ):void
        {
            var components:Array = getComponentsFromXML(xml.-
component);
            var i:int = 0;
            var n:int = components.length;
            var bLayoutFlag:Boolean = false;
            var arrLayoutComponents:Array = [ ];
            var nLayoutCnt:int = 0;
            var objBox:Box;
            var output:Object;
            for (i; i < n; i++) {
                if (components[i].toString( ) == "HBox24" ||
components[i].toString( ) == "VBox24") {
                    arrLayoutComponents.push(components[i] as
DisplayObject);
                    nLayoutCnt = nLayoutCnt + 1;
                    bLayoutFlag = true;
                    objBox = components[i];
                } else if (bLayoutFlag == true) {
                    objBox.addChild(components[i] as DisplayObject);
                }
                if (!bLayoutFlag) {
                    canvas.addChild(components[i] as DisplayObject);
                }
            }
            if (arrLayoutComponents != null) {
                for (var nCnt:int = 0; nCnt < arrLayoutComponents.length;
nCnt++ )
{
                    canvas.addChild(arrLayoutComponents[nCnt]);
```

TABLE 11-continued

```
        }
    }
}
/**
* Parses an XML string, returns array of new components.
*/
public function
getComponentsFromXML(components:XMLList):Array
{
    var result:Array = [ ];
    var child:Object;
    var component:UIComponent;
    var type:String;
    var style: String;
    var clazz:Class;
    var i:int = 0;
    var n:int = components.length( );
    for (i; i < n; i++)
    {
        child = components[i];
        type = child.@type;
        style = child.@style;
        try {
            clazz = flash.utils.getDefinitionByName(type) as Class;
        } catch (error:ReferenceError) {
            traceImportError(type);
        }
        component = new clazz( ); // dynamic
                    component.styleName = style;
        var properties:XMLList = child.elements( );
        var property:XML;
        var name:String;
        var value:Object;
        // for each child node
        for each (property in properties)
        {
            name = property.localName( );
            value = property.toString( );
            if (/\d+/.test(value.toString( )))
                value = Number(value);
            if (property.attribute("isStyle") == "true")
                component.setStyle(name, value);
            else
                component[name] = value;
        }
        result.push(component);
    }
    return result;
}
protected function traceImportError(type:String):void
{
    trace("Please include the class '" + type + "' in the swf.");
    var names:Array = type.split(".");
    var last:String = names[names.length – 1];
    trace("import " + type + "; " + last + ";");
}
]]>
</mx:Script>
- <!-- sample data -->
    <mx:XML id="xml" source="components.xml" />
- <!-- sample container -->
- <mx:Panel id="panel" width="100%" height="100%">
    - <mx:Canvas id="canvas" width="100%" height="100%">
        <mx:HBox id="layoutHorizontal" />
        <mx:VBox id="layoutVertical" />
        <mx:Label />
    </mx:Canvas>
</mx:Panel>
</mx:Application>
```

The wrapper of Table 11 includes the following line: '<mx:XML id="xml" source="components.xml"/>'. This line may be used to import or incorporate the implementation language dependent specification of Table 9 into the wrapper. The wrapper may then be compiled into a binary file, e.g. an SWF file. Alternatively, the entire user interface may be generated by the template processor 158, possibly in combination with other code.

Figure 4:
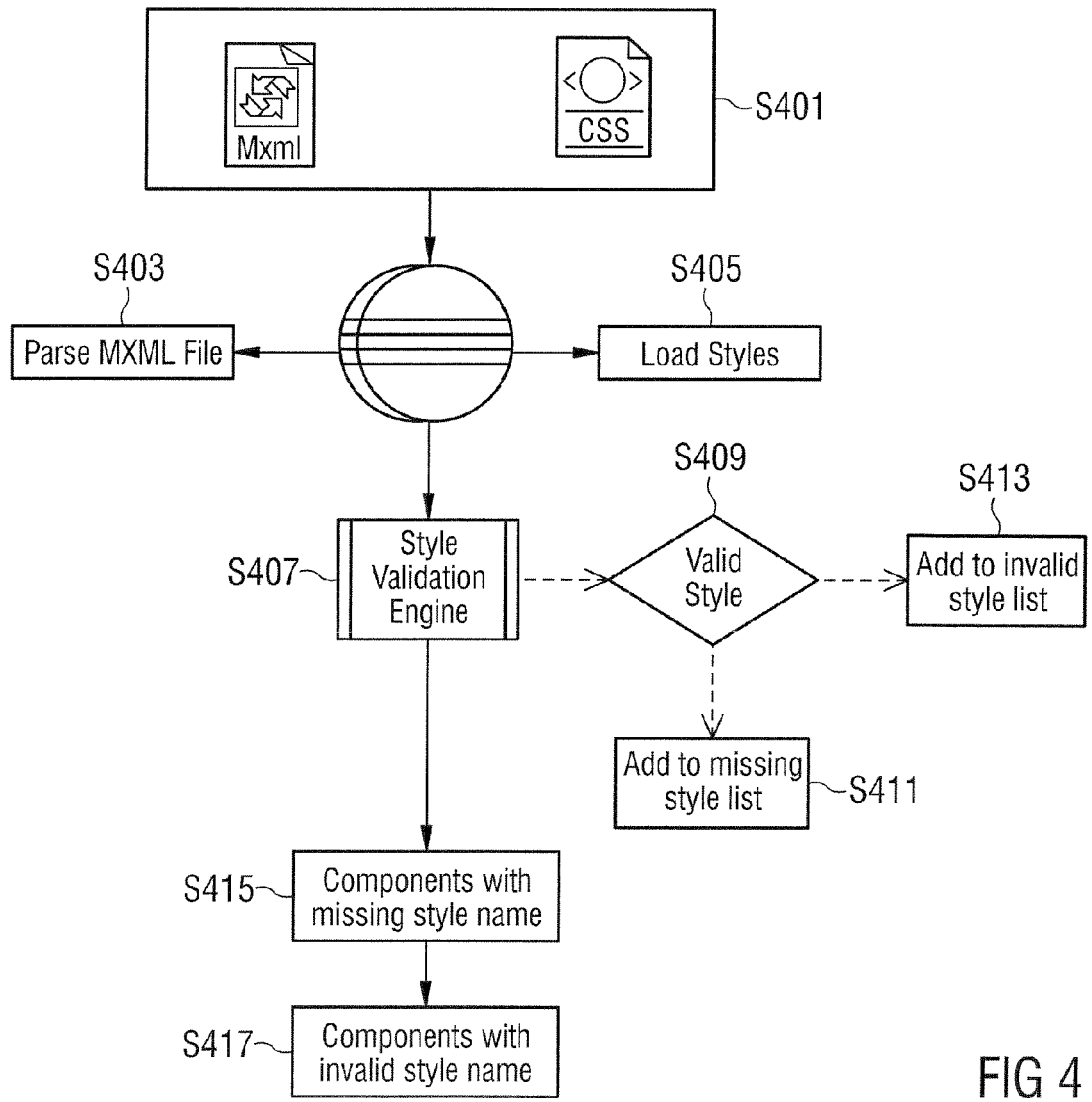
FIG. 4 is flow chart of an exemplary method for verifying presentation semantics of an implementation language dependent specification of the user interface.

FIG. 4 depicts a method of verifying presentation semantics of the implementation language dependent specification of the user interface. This may be useful in a number of cases. For example, there may be a requirement to change the look and formatting of the user interface over time. This may be achieved by creating new presentation rules and attributes or modifying existing presentation rules and attributes. Presentation rules may be implemented in cascading style sheets or individual styles. In order to develop the user interface with a look and format meeting user requirements, multiple stages or iterations may be required. In particular, a new or modified user interface created according to new or modified presentation rules maybe displayed for the user to review. Based on the review, new requirements may be developed or existing requirements may be modified or further specified. Multiple reviews may be required before a final or production user interface is created.

It is also possible that style guides were not properly applied or coating standards were not adhered to during the development of the user interface. This may lead to additional stages of review before the final user interface is developed. Moreover, reviewing user interface code to check if the code adheres to specify presentation rules and attributes may be a difficult and error prone task. Existing tools may not be suitable for verifying that an implementation language dependent specification of a user interface adheres to a defined set of presentation semantics. Presentation semantics may be understood to include presentation rules and/or presentation attributes.

Verification of presentation semantics may be achieved using the following two components: first, the set of presentation rules, assembled based on user requirements. The set of presentation rules may be used as a standard for all user interface developments. The second component may be implemented as a plug-in that is configured in an integrated development environment (IDE), e.g. Eclipse or Adobe Flex builder. In order to perform verification of presentation semantics, the user may click on a menu option to evaluate an implementation language dependent specification against the set of presentation rules. If any violations are found, a list may be shown. According to a specific example, the implementation language is MXML and the set of presentation rules is a CSS style sheet.

FIG. 4 may be divided into three sections: first, data input including step S401; second, IDE processing including steps S403 to S413; and third, console output including steps S415 and S417.

At step S401, the implementation language dependent specification and a set of one or more presentation rules are provided as input. The set of presentation rules may include one or more definitions of presentation rules referred to in the implementation language dependent specification. For example, the implementation language dependent specification may include a style name and the set of presentation rules may include a style definition corresponding to the style name. At step S403, the implementation language dependent specification may be parsed in order to select at least one presentation rule.

At step S405, the set of presentation rules may be loaded. The definitions in the set of presentation rules may include one or more presentation attributes corresponding to the presentation rule selected at step S403.

At step S407, a style validation engine, or similar software component, may be activated. The style validation engine may use the parsed implementation language dependent specification and the set of presentation rules to verify the presentation semantics of the implementation language dependent specification. The style validation engine may be a plug-in that interfaces with the IDE using plug-in APIs of the IDE.

At step S409, a determination may be made for each user interface component in the implementation language dependent specification. If a particular presentation rule should be associated with the user interface component and is not associated with the user interface component, the particular presentation rule may be added to a missing style list (list of missing rules) at step S411. If an incorrect presentation rule is associated with the user interface component, the incorrect presentation rule may be added to an invalid style list (list of invalid styles) at step S413.

At step S415 the missing style list generated in S411 may be output in the integrated development environment. At step S417, the invalid style list generated in step S417 may be output in the IDE.

Accordingly, the steps described with respect to FIG. 4 may provide a developer with an easy and efficient way of checking the implementation language dependent specification against the set of presentation rules. Thus, the method of verifying presentation semantics described with respect to FIG. 4 may provide a single-click process to check the implementation language dependent specification against the set of presentation rules and provide a list of style guideline violations (e.g. no style associated with a user interface component or an incorrect style associated with the user interface component), which can be quickly and efficiently corrected. The list of style guideline violations may include the missing style list and/or the invalid style list.

Figure 5:
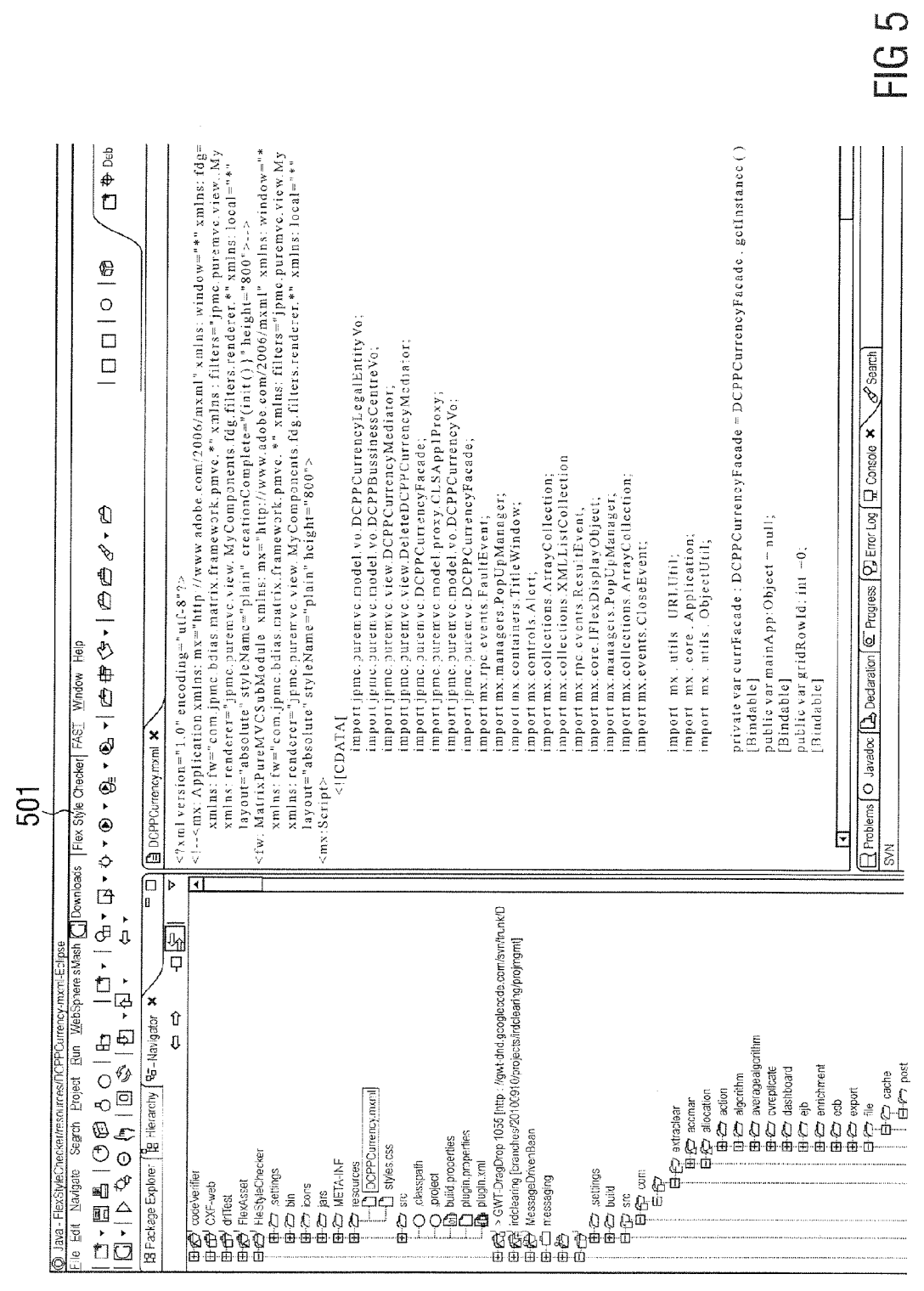

FIG. 5 shows a screen shot of the Eclipse IDE. The screen shot shows a Flex style checker menu 501. The Flex style checker menu 501 can be used to cause a computer system to carry out the steps of FIG. 4.

Figure 6:
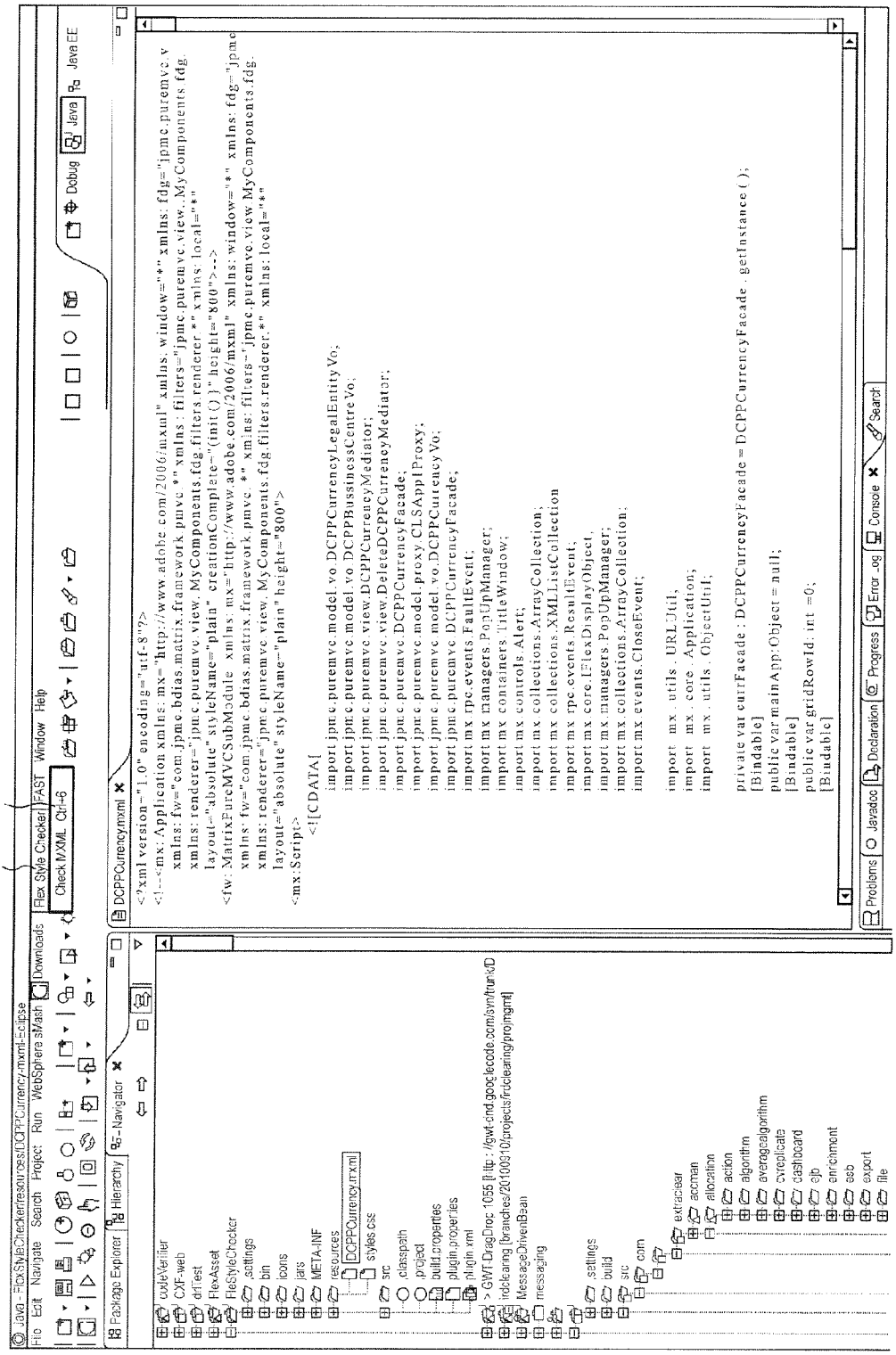
FIG. 6 shows another screen shot of the integrated development environment including the software component.

FIG. 6 shows a check MXML menu option 601 of the Flex style checker menu 501 that can be used to carry out the steps described with respect to FIG. 4. Although Flex and MXML are referred to in this specific example, other forms of extensible markup language (XML) or other markup languages compatible with CSS style sheets could also be used.

Figure 7:
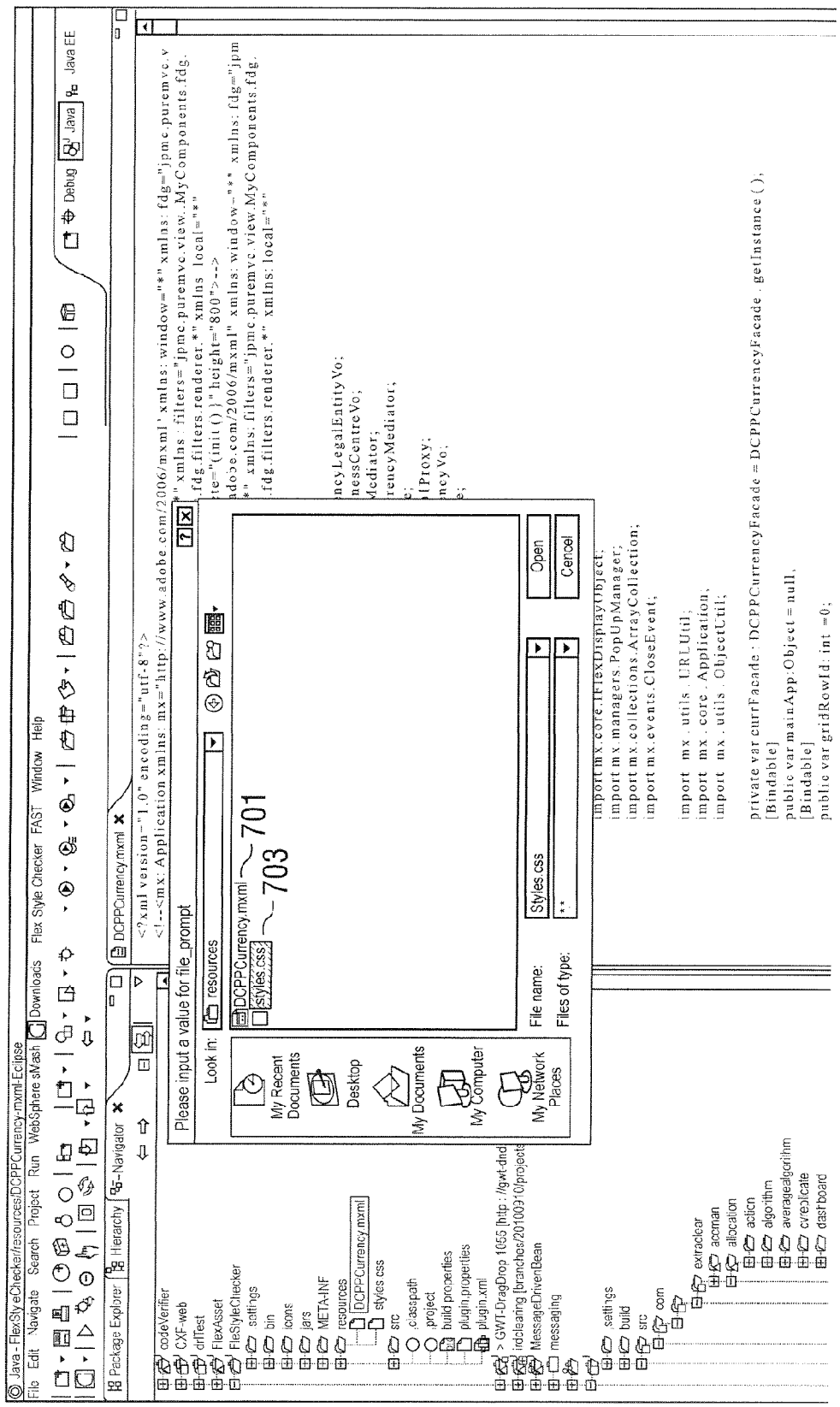
FIG. 7 shows yet another screen shot of the integrated development environment including the software component.

FIG. 7 depicts the selection of the set of presentation rules 701. The set of presentation rules 701 may be used, e.g. by a presentation verifier, to verify presentation semantics of an implementation language dependent specification 703.

Figure 8:
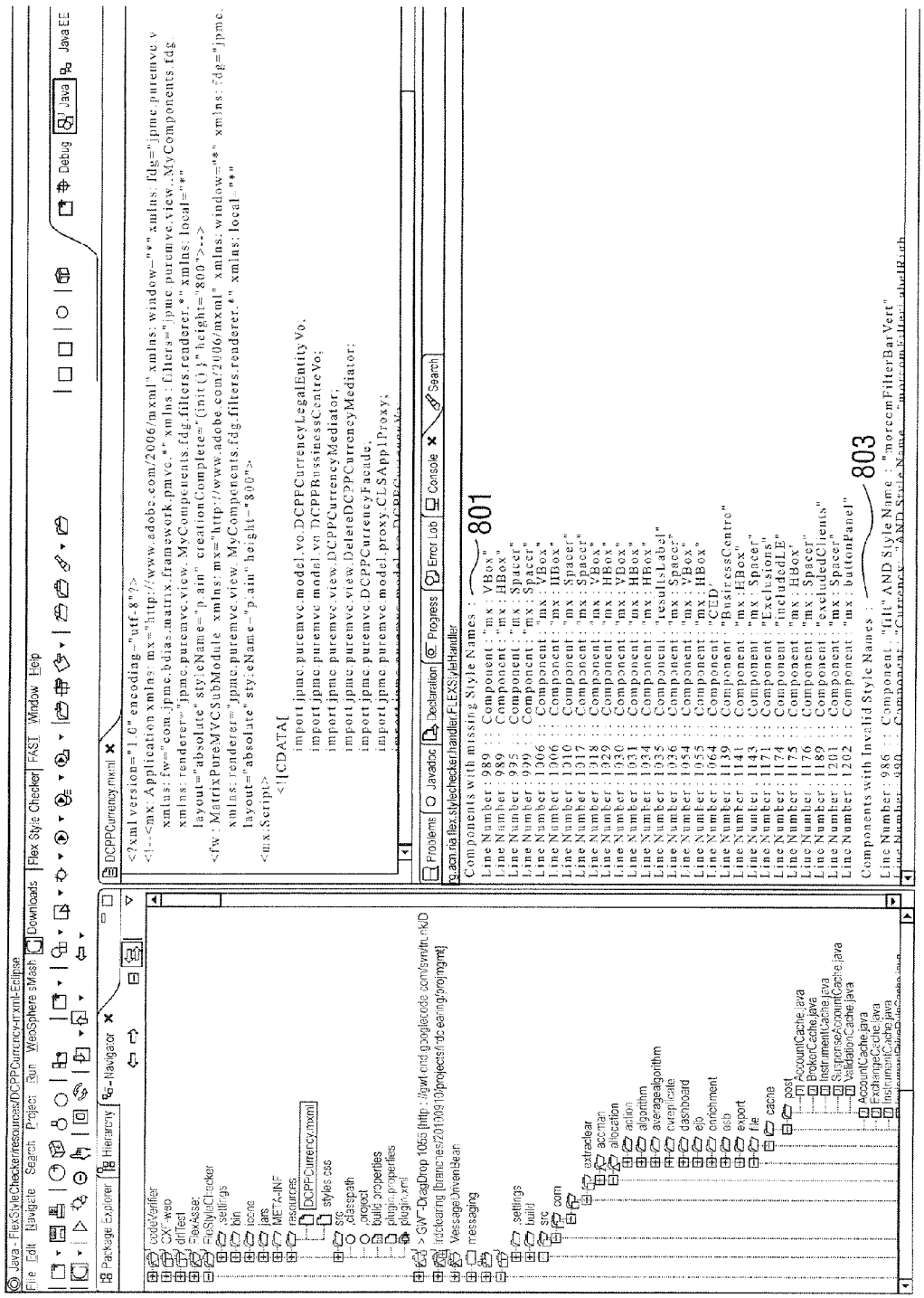
FIG. 8 shows a further screen shot of the integrated development environment including the software component.

FIG. 8 depicts output that may be produced after verifying presentation semantics of an implementation language dependent specification. A set of missing style names 801 may be produced after carrying out step S415 referred to in FIG. 4. A set of invalid style names 803 may be produced after carrying out step S417 referred to in FIG. 4.

Figure 9:
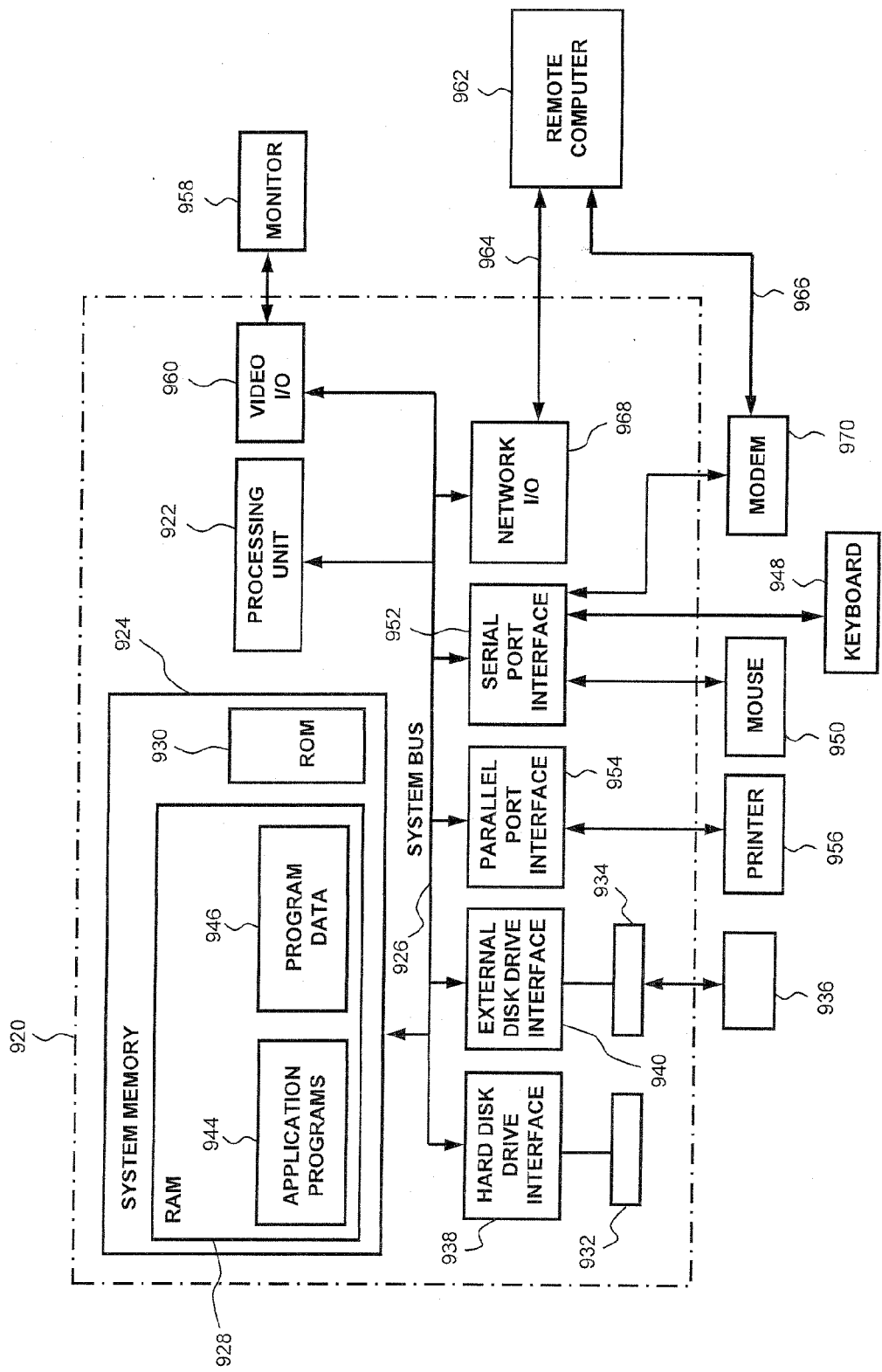
FIG. 9 shows an exemplary system for implementing the claimed subject matter including a general purpose computing device in the form of a conventional computing environment.

FIG. 9 shows an exemplary system for implementing the claimed subject matter including a general purpose computing device in the form of a conventional computing environment 920 (e.g. a personal computer). The conventional computing environment includes a processing unit 922, a system memory 924, and a system bus 926. The system bus 9926 couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read-only memory (ROM) 930. A basic input/output system (BIOS) containing the basic routines that help to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer-readable instructions, data structures, program modules and other data for the personal computer 920. The data structures may include relevant data for the implementation of the method for displaying a user interface component according to an implementation language independent description of the user interface component. The relevant data may be organized in a database, for example a relational or object database (not shown).

Although the exemplary environment described herein employs a hard disk (not shown) and an external disk 936, it should be appreciated by those skilled in the art that other types of compute-readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 9.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor 958, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 9 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 9 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore, other data relevant to method for displaying a user interface component according to an implementation language independent description of the user interface component (described above), may be resident on or accessible via the remote computer 962. It will be appreciated that the network connections shown are exemplary and other means of establishing a communications link between the electronic devices may be used.

The above-described computing system is only one example of the type of computing system that may be used to implement the method for displaying a user interface component according to an implementation language independent description of the user interface component.

According to an aspect, a computer implemented method for displaying a user interface component according to an implementation language independent description of the user interface component is provided. The method may comprise selecting, based on a characteristic of the implementation language independent description, a description parser. The method may further comprise receiving the implementation language independent description. In addition, the method may comprise determining an implementation language for displaying the user interface component. The method may also comprise parsing, by the description parser, the implementation language independent description by identifying an implementation language independent type, and determining an implementation language dependent type of the user interface component based on the implementation language independent type and the implementation language. The method may further comprise identifying a presentation rule corresponding to the implementation language dependent type. The method may also comprise selecting, according to the implementation language, a set of instructions for processing the parsed description. Furthermore, the method may comprise processing the parsed description according to the set of instructions in order to create an implementation language dependent specification of the user interface component, wherein the processing comprises including an association of the implementation language dependent type with the presentation rule in the implementation language dependent specification. The method may also include displaying the user interface component by means of the implementation language dependent specification.

The step of receiving the implementation language independent description may be performed before or after the step of selecting the description parser. The characteristics may be a file format of the implementation language independent description or a means of receiving the implementation language independent description. Although a number of examples in the present application refer to MXML as the implementation language, other implementation languages suitable for displaying user interface components may be used. The determination of the implementation language may be made based on user input.

Parsing the implementation language independent description in order to identify an implementation language independent type may also be described such that parsing the implementation language independent description comprises identifying an implementation language independent type.

Identifying a presentation rule corresponding to the implementation language dependent type may be performed by parsing the implementation language independent description. Alternatively, the identifying may be performed by checking a map entry.

Displaying the user interface component may be carried out by means of a web browser.

The method may further comprise compiling the information language dependent specification into a binary file.

Compiling the implementation language dependent specification may comprise performing, by a compiler, compilation operations on the implementation language dependent specification. The binary file may in small web format. The binary file may be displayable by a web browser.

The method may further comprise verifying presentation semantics of the implementation language dependent specification of the user interface component by parsing the implementation language dependent specification in order to select at least one presentation rule in the implementation language dependent specification, and parsing a set of presentation rules in order to determine if the selected presentation rule is in the set of presentation rules. The method may further comprise determining that the presentation rule is invalid if the selected presentation rule is not in the set of presentation rules, and determining that the presentation rule is valid if the selected presentation rule is in the set of presentation rules.

The set of presentation rules may be implemented as a CSS style sheet. The set of presentation rules may be external to the specification or concatenated with the specification. Each presentation rule may be implemented as a style.

A presentation verifier, also referred to as a style validation engine, may be used in an integrated development environment. The presentation verifier may verify that each implementation language dependent type has an associated presentation rule.

The characteristic may be a format of the implementation language independent description or a means of receiving the implementation language independent description. An example of the means of receiving is receiving as a result of accessing a database.

The characteristic may be one of the following: a delimiter of the implementation language independent description, an implementation language independent description is encoded in a binary format, an implementation language independent description includes markup language annotations, or the implementation language independent description is received by accessing a database management system. The delimiter may be implemented as a comma or a semicolon or a tab. The binary format may be Microsoft XLS, e.g. binary interchange file format (BIFF), or another format that is not generated by means of compilation operations. The markup language annotations may be in XML.

Determining the implementation language dependent type and/or identifying the presentation rule may comprise checking a map entry, wherein the map entry may associate the implementation language independent type and the implementation language dependent type, and wherein the map entry may associate the documentation language independent type, the implementation language dependent type, and the presentation rule. A map may comprise multiple map entries. The map entry may also be referred to as a mapping definition. The map may also be referred to as a dictionary. The map may facilitate replacing existing features of a GUI with new implementation language dependent features without the need to modify existing implementation language independent descriptions that use (or are dependent on) the existing features.

The implementation language independent description may include a user specified presentation attribute of the user interface component, wherein parsing the implementation language independent description further comprises identifying the user specified presentation attribute, and wherein processing the parsed description further comprises including the user specified presentation attribute in the implementation language dependent specification. The inclusion of the user specified presentation attribute in the implementation language independent description may result in enhanced flexibility at the cost of standardization of the user interface.

Parsing the implementation language independent description may comprise inserting the implementation language independent description into a data structure. The data structure may be object-oriented, e.g. the data structure may include one or more value objects. The value objects may be collected in a data transfer object. Alternatively, the data structure may include a collection of elements that are not assembled in an object-oriented way.

The implementation language for displaying the user interface component may be one of the following: MXML, XAML, SVG, UIML, XUL, Coral, or Java FX.

The method may further comprise declaring the description parser and a selector for the selecting the set of instructions as dependencies, and instantiating and configuring the description parser and the selector by means of an inversion of control container. The inversion of control container may also be referred to as an external container.

Displaying the user interface component may include incorporating the implementation language dependent specification into a wrapper. The wrapper may be written in the same implementation language as the implementation language dependent specification.

In some cases, the implementation language independent description must be translated before being compiled into binary code, and it may not be possible to display the implementation language independent description via a web browser directly.

According to another aspect, a computer-implemented method for generating a graphical user interface is provided. The graphical user interface may include a plurality of user interface components, each user interface component being generated according to the method described above. Selecting the description parser and receiving the implementation language independent description may be carried out only once when generating the graphical user interface. In addition, the implementation language may be determined for displaying the graphical user interface and each component thereof. The entire implementation language independent description of the graphical user interface might only be parsed once, however, an implementation language independent type may be identified for each user interface component. Also, an implementation language dependent type and a presentation rule may be determined for each user interface component. The set of instructions for processing the parsed description may be selected for the graphical user interface and all components thereof. Thus, the parsed description may describe all the user interface components of the user interface. The step of displaying may also be carried out by displaying the graphical user interface including all components thereof.

According to yet another aspect, a computer program product is provided. The computer program product may comprise computer readable instructions, which, when loaded and executed on a computer system, cause the computer system to perform operations according to the method described above.

According to a further aspect, a computer system for displaying a user interface component according to an implementation language independent description of the user interface component is provided. The system may comprise a parser selection engine operable to select, based on a characteristic of the implementation language independent description, a description parser. The description parser may be operable to receive the implementation language independent description, identify an implementation language independent type and a presentation rule, and determine an implementation language dependent type of the user interface component based on the implementation language independent type and the implementation language. The system may further comprise a processor operable to select, according to the implementation language, a set of instructions for processing the parse description, and to process the parsed description according to the set of instructions in order to create an implementation language dependent specification of the user interface component. The processing may comprise including an association of the implementation language dependent type with the presentation rule in the implementation language dependent specification. The system may further comprise a display operable to display the user interface component by means of the implementation language dependent specification.

Use of the implementation language independent description may be advantageous since it enables a user to describe a user interface without having to know the complex details of a particular technology, i.e. an implementation language. Moreover, if the way of describing a type, a presentation rule, or a presentation attribute in a particular implementation language is changed, possibly due to an update of the implementation language, the same implementation language independent description can continue to be used. This reduces the effort of the user, since the user does not need to keep track of the updates to the implementation language or update the implementation language independent description of the user interface component. Also, a user interface can be displayed by means of multiple implementation languages simply by creating sets of instructions for processing the description of the user interface. This may be particularly advantageous if a large number of user interface descriptions are created.

What is claimed is:

1. A computer-implemented method for displaying a user interface component according to an implementation language independent description of the user interface component, the method comprising:
   receiving the implementation language independent description;
   determining an implementation language for displaying the user interface component;
   determining an implementation language dependent type of the user interface component based on the implementation language;
   processing, by a hardware processor, the implementation language independent description, wherein the processing includes creating an implementation language dependent specification of the user interface component including the implementation language dependent type; and
   displaying the user interface component according to the implementation language dependent specification of the user interface component.

2. The method of claim 1, further comprising compiling the implementation language dependent specification into a binary file.

3. The method of claim 2, wherein compiling the implementation language dependent specification comprises performing, by a compiler, compilation operations on the implementation language dependent specification, wherein the binary file is displayable by a web browser.

4. The method of claim 1, further comprising verifying presentation semantics of the implementation language dependent specification of the user interface component, wherein the verifying comprises:
   parsing the implementation language dependent specification in order to select at least one presentation rule in the implementation language dependent specification;
   parsing a set of presentation rules in order to determine if the selected presentation rule is in the set of presentation rules;
   determining that the presentation rule is invalid if the selected presentation rule is not in the set of presentation rules; and
   determining that the presentation rule is valid if the selected presentation rule is in the set of presentation rules.

5. The method of claim 1, comprising:
   selecting, based on a characteristic of the implementation language independent description, a description parser to parse the implementation language independent description, wherein the processing includes processing, by the selected description parser, the parsed implementation language independent description to create the implementation language dependent specification.

6. The method of claim 5, wherein the characteristic is a format of the implementation language independent description or is associated with receiving the implementation language independent description.

7. The method of claim 5, wherein the characteristic includes a delimiter of the implementation language independent description, the implementation language independent description is encoded in a binary format, the implementation language independent description includes markup language annotations, or the implementation language independent description is received by accessing a database management system.

8. The method of claim 5, wherein the implementation language independent description includes a user specified presentation attribute of the user interface component, and parsing the implementation language independent description further comprises identifying the user specified presentation attribute, wherein processing the parsed description further comprises including the user specified presentation attribute in the implementation language dependent specification.

9. The method of claim 5, wherein parsing the implementation language independent description comprises inserting the implementation language independent description into a data structure.

10. The method of claim 5, further comprising
    instantiating and configuring the description parser according to an inversion of control container.

11. The method of claim 1, wherein determining the implementation language dependent type comprises:
  checking a map entry,
    wherein the map entry associates the implementation language independent type and the implementation language dependent type.

12. The method of claim 1, wherein the implementation language for displaying the user interface component is one of the following: MXML, XAML, SVG, UIML, XUL, Curl, or JavaFX.

13. The method of claim 1, further comprising
  wherein displaying the user interface component includes incorporating the implementation language dependent specification into a wrapper, and
  wherein the wrapper is written in the same implementation language as the implementation language dependent specification.

14. The method of claim 1, further comprising:
  identifying a presentation rule corresponding to the implementation language dependent type, wherein the displaying comprises displaying the user interface component according to the presentation rule.

15. A computer system to display a user interface component according to an implementation language independent description of the user interface component, the system comprising:
  a hardware processor to:
    determine an implementation language to display the user interface component;
    determine an implementation language dependent type of the user interface component based on the implementation language;
    process the implementation language independent description, wherein the processing includes
      creating an implementation language dependent specification of the user interface component including the implementation language dependent type of the user interface component; and
      associating a presentation rule with the implementation language dependent type; and
  a display to display the user interface component according to the implementation language dependent specification of the user interface component and the associated presentation rule.

16. The computer system of claim 15, wherein the processor is to select, based on a characteristic of the implementation language independent description, a description parser to parse the implementation language independent description, wherein the parsed implementation language independent description is parsed to create the implementation language dependent specification.

17. The computer system of claim 15, wherein the processor is to:
  determine that the presentation rule is invalid if the selected presentation rule is not in a set of presentation rules; and
  determine that the presentation rule is valid if the selected presentation rule is in the set of presentation rules, and display the user interface component according to the presentation rule if presentation rule is valid.

18. The computer system of claim 15, wherein the processor is to incorporate the implementation language dependent specification into a wrapper to display the user interface component, wherein the wrapper is in the same implementation language as the implementation language dependent specification.

19. A computer system to facilitate displaying a user interface component according to an implementation language independent description of the user interface component, the system comprising:
  a hardware processor to:
    select, based on a characteristic of the implementation language independent description, a description parser;
    receive the implementation language independent description;
    determine an implementation language for displaying the user interface component;
    parse, by the description parser, the implementation language independent description, wherein to parse the implementation language independent description, the description parser is to:
      identify an implementation language independent type;
      determine an implementation language dependent type of the user interface component based on the implementation language independent type and the implementation language;
      insert the implementation language independent description into a data structure, wherein the data structure includes a value object, wherein the value object groups information for the user interface component such that the user interface component and its corresponding features are distinguished from other user interface components in the value object; and
      identify a presentation rule corresponding to the implementation language dependent type, wherein the value object includes the implementation language dependent type and the presentation rule; and
    process the parsed description to create an implementation language dependent specification of the user interface component, wherein the processing includes an associating the implementation language dependent type with the presentation rule in the implementation language dependent specification, wherein the user interface component is displayable based on the implementation language dependent specification.

20. The computer system of claim 19, wherein a binary file is to be generated by compiling the implementation language dependent specification.

21. The computer system of claim 20, wherein the user interface component is displayed by a web browser processing the binary file.

* * * * *